US012655793B1

(12) United States Patent
Johnson et al.

(10) Patent No.: US 12,655,793 B1
(45) Date of Patent: Jun. 16, 2026

(54) POWER GENERATING SYSTEM FOR A GAS TURBINE ENGINE COMPRISING A COMPRESSOR BLEED AIR TO EXHAUST HEAT EXCHANGER

(71) Applicant: General Electric Company, Evendale, OH (US)

(72) Inventors: Steven Douglas Johnson, Milford, OH (US); Scott G. Edens, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/202,373

(22) Filed: May 8, 2025

(51) Int. Cl.
| | |
|---|---|
| *F02C 6/08* | (2006.01) |
| *F02C 3/13* | (2006.01) |
| *F02C 7/10* | (2006.01) |
| *F02C 7/141* | (2006.01) |
| *F02C 7/18* | (2006.01) |
| *F02C 9/18* | (2006.01) |

(52) U.S. Cl.
CPC .................. *F02C 6/08* (2013.01); *F02C 3/13* (2013.01); *F02C 7/10* (2013.01); *F02C 7/141* (2013.01); *F02C 7/18* (2013.01); *F02C 9/18* (2013.01)

(58) Field of Classification Search
CPC ...... F02C 9/18; F02C 6/08; F02C 7/08; F02C 7/10; F02C 7/141; F02C 7/16; F02C 7/18; F02C 7/185; F02C 3/13; F05D 2220/76; F05D 2260/213
See application file for complete search history.

(56) References Cited

U.S. PATENT DOCUMENTS

| | | | |
|---|---|---|---|
| 4,081,956 | A | 4/1978 | Baker et al. |
| 5,414,992 | A * | 5/1995 | Glickstein ............... F02C 7/224 |
| | | | 60/39.83 |
| 6,397,578 | B2 | 6/2002 | Tsukamoto et al. |
| 8,539,749 | B1 | 9/2013 | Wichmann et al. |
| 9,181,873 | B2 | 11/2015 | Hoffmann et al. |
| 10,436,074 | B2 | 10/2019 | Hinders et al. |
| 10,865,710 | B2 | 12/2020 | Wang et al. |
| 11,255,223 | B2 | 2/2022 | Akhtar |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — William H Rodriguez
(74) *Attorney, Agent, or Firm* — Venable LLP; Edward A. Kmett; Michele V. Frank

(57) ABSTRACT

A power generating system for a gas turbine engine includes a compressor bleed air duct in fluid communication with a compressor bleed air passage, a heat exchanger arranged within an exhaust section of the gas turbine engine, and a power turbine. A compressor bleed air is provided to the heat exchanger via the compressor bleed air duct. The heat exchanger receives a flow of combustion gases from a turbine section of the gas turbine engine, and utilizes the combustion gases to heat the compressor bleed air to generate heated bleed air. The heated bleed air flows from the heat exchanger to the power turbine, and drives rotation of the power turbine. The power turbine is connected with a generator such that rotation of the power turbine generates power by the generator.

11 Claims, 9 Drawing Sheets

(56)  References Cited

U.S. PATENT DOCUMENTS

| 11,702,981 B1 * | 7/2023 | Taylor | F02C 7/18 |
| | | | 60/785 |
| 11,852,074 B1 | 12/2023 | Smith | |
| 2017/0291712 A1 | 10/2017 | Himmelmann et al. | |
| 2024/0102417 A1 * | 3/2024 | Taylor | F02C 7/32 |
| 2024/0117764 A1 * | 4/2024 | Taylor | F02C 3/10 |
| 2024/0352866 A1 * | 10/2024 | Vondrell | F01D 11/20 |

FOREIGN PATENT DOCUMENTS

| FR | 3130897 A1 | 6/2023 |
| FR | 3133367 A1 | 9/2023 |
| FR | 3133368 A1 | 9/2023 |

* cited by examiner

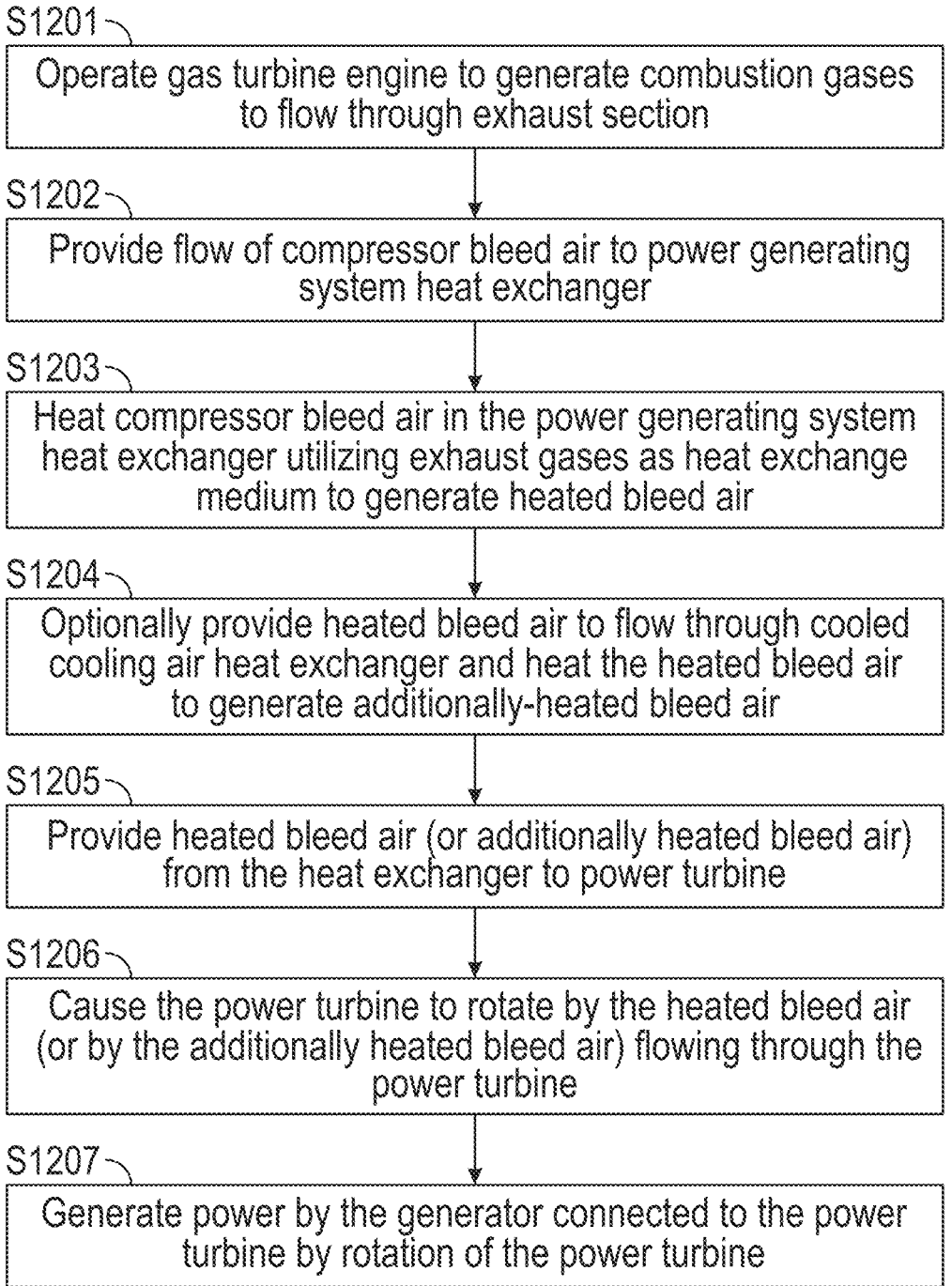

S1201

Operate gas turbine engine to generate combustion gases to flow through exhaust section

S1202

Provide flow of compressor bleed air to power generating system heat exchanger

S1203

Heat compressor bleed air in the power generating system heat exchanger utilizing exhaust gases as heat exchange medium to generate heated bleed air

S1204

Optionally provide heated bleed air to flow through cooled cooling air heat exchanger and heat the heated bleed air to generate additionally-heated bleed air

S1205

Provide heated bleed air (or additionally heated bleed air) from the heat exchanger to power turbine

S1206

Cause the power turbine to rotate by the heated bleed air (or by the additionally heated bleed air) flowing through the power turbine

S1207

Generate power by the generator connected to the power turbine by rotation of the power turbine

POWER GENERATING SYSTEM FOR A GAS TURBINE ENGINE COMPRISING A COMPRESSOR BLEED AIR TO EXHAUST HEAT EXCHANGER

TECHNICAL FIELD

The present disclosure relates generally to a power generating system for a gas turbine engine.

BACKGROUND

Gas turbine engines provide the ability to generate power (e.g., electrical power) for powering various systems of an aircraft upon which the gas turbine engine is mounted. In some gas turbine engines, a generator may be mounted to an accessory gearbox that is driven by a drivetrain of the gas turbine engine. In some other gas turbine engines, a steam system may be implemented, and a separate steam turbine may be included and used to generate power by providing a flow of steam from the steam system to the steam turbine.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

FIG. 12 is a flowchart of process steps for a method of generating auxiliary power in a gas turbine engine, according to an aspect of the present disclosure.

2

DETAILED DESCRIPTION

Figure 1:
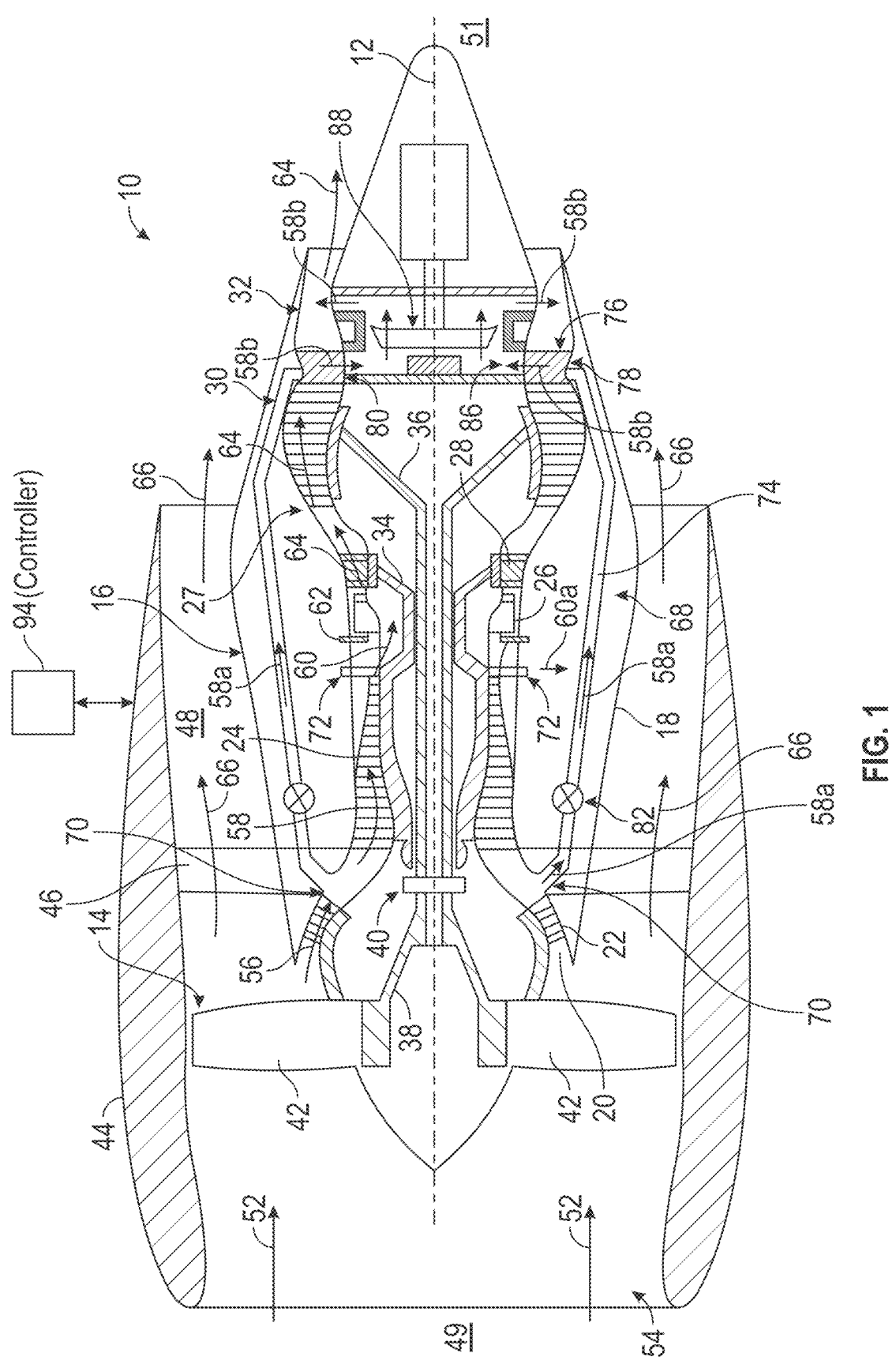
FIG. 1 is a schematic, partial cross-sectional side view of an exemplary high by-pass turbofan jet engine as may incorporate various embodiments of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan.

As used herein, the term "radially" refers to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbine engine includes, for example, a low-power operation, a mid-level power operation, and a high-power operation. Low-power operation includes, for example, engine start, idle, taxiing, and approach. M id-level power operation includes, for example, cruise. High-power operation includes, for example, takeoff and climb.

The terms "coupled," "connected," and the like, refer to both direct coupling, fixing, attaching, or connecting, as well as indirect coupling, fixing, attaching, or connecting through one or more intermediate components or features, unless otherwise specified herein.

The term "arranged in fluid communication with" or "in fluid communication with" or the like refers to elements that are fluidly connected together or arranged adjacent to one another to allow a flow of a fluid, including air, fuel, exhaust gases, etc., to flow from one element and to be received by the other element.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Gas turbine engines provide the ability to generate power (e.g., electrical power) for powering various systems of an aircraft upon which the gas turbine engine is mounted. In some gas turbine engines, a generator may be mounted to an accessory gearbox that is driven by a drivetrain of the gas turbine engine. In some other gas turbine engines, a steam system may be implemented, and a separate steam turbine may be included and used to generate power by providing a flow of steam from the steam system to the steam turbine.

The present disclosure provides a technique for generating power in a gas turbine engine by implementing a Brayton cycle type machine. More specifically, a waste-heat-recovery heat exchanger is implemented in an exhaust section of the gas turbine engine and utilizes hot exhaust gases to transfer heat to a flow of compressor bleed air flowing through the heat exchanger. The compressor bleed air flows through the heat exchanger and is heated by the heat exchanger using the waste heat from the exhaust gases. Heated bleed air is then provided from the heat exchanger to a power turbine to drive the power turbine. The power turbine is connected to a generator to drive the generator to generate power. As a result, the compressor bleed air and the waste heat from the turbine engine exhaust can be used to generate power in an open loop Brayton cycle type system. In addition, the system does not require a condenser that may otherwise be required in a heat exchange system that utilizes steam as a heating agent within the heat exchanger. Further, the implementation of the heat exchanger within the exhaust to use waste heat as the heating agent to heat the compressor bleed air that drives the power turbine is more tolerant to small leaks and does not require the heat exchanger to be hermetically sealed, thereby simplifying the overall power generating system.

Referring now to the drawings, FIG. 1 is a schematic, partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines such as that shown in FIG. 1, but can be implemented in unducted fan (UDF) type turbine engines that may include a twin annular pre-mixing swirler (TAPS) combustor. As shown in FIG. 1, the engine 10 has a longitudinal centerline axis 12 that extends therethrough from an upstream end 49 of the engine 10 to a downstream end 51 of the engine 10 for reference purposes. In general, the engine 10 may include a fan assembly 14 and a turbo-engine 16 disposed downstream from the fan assembly 14.

The turbo-engine 16 may generally include an outer casing 18 that defines an annular inlet 20 to the turbo-engine 16. The outer casing 18 encases, or at least partially forms, in a serial flow relationship, a booster or a low-pressure (LP) compressor 22, a high-pressure (HP) compressor 24, a combustor 26, a turbine section 27 that includes an HP turbine 28 and an LP turbine 30, and an exhaust section 32. An HP rotor shaft 34 drivingly connects the HP turbine 28 to the HP compressor 24. An LP rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gearbox assembly 40, such as in an indirect-drive or a geared-drive configuration. In other embodiments, although not illustrated, the engine 10 may further include an intermediate-pressure (IP) compressor and an IP turbine rotatable with an intermediate-pressure shaft that connects the IP turbine and the IP compressor.

As shown in FIG. 1, the fan assembly 14 includes a plurality of fan blades 42 that are coupled to, and extend radially outwardly from, the fan shaft 38. An annular fan casing or a nacelle 44 circumferentially surrounds the fan assembly 14, or at least a portion of the turbo-engine 16, or both. The nacelle 44 may be supported relative to the turbo-engine 16 by a plurality of circumferentially spaced outlet guide vanes or struts 46. Moreover, at least a portion of the nacelle 44 may extend over an outer portion of the turbo-engine 16 so as to define a bypass airflow passage 48 between the nacelle 44 and the outer casing 18.

In operation of the engine 10, which may be controlled by an engine controller 94, a volume of inlet air 52 enters the nacelle 44 at a nacelle inlet 54, and the inlet air 52 is propelled through the fan assembly 14. A portion of the inlet air 52 propelled by the fan assembly 14 enters the LP compressor 22 via the annular inlet 20 as a compressor inlet airflow 56, where the compressor inlet airflow 56 is compressed by the LP compressor 22 to generate compressed air 58. The compressed air 58 then flows to the HP compressor 24, where the compressed air 58 is further compressed to generate compressed air 60. The compressed air 60 from the HP compressor 24 enters the combustor 26. In the combustor 26, the compressed air 60 is mixed with fuel that is injected into the combustor by one or more fuel nozzles 62 to generate a fuel-air mixture (not shown) within the combustor 26. The fuel-air mixture is ignited and burned within the combustor 26 to generate combustion gases 64. The combustion gases 64 flow through the turbine section 27, where work is extracted from the combustion gases 64 by the HP turbine 28 to rotate the HP turbine 28. The rotation of the HP turbine 28 thereby supports rotation of the HP compressor 24 via the HP rotor shaft 34. The combustion gases 64 then continue to flow downstream of the HP turbine 28 to the LP turbine 30, where additional work is extracted from the combustion gases 64 to rotate the LP turbine 30. The rotation of the LP turbine 30 thereby supports rotation of the LP compressor 22 via the LP rotor shaft 36, and also supports rotation of the fan assembly 14 via the fan shaft 38 connected to the reduction gearbox assembly 40. The remaining combustion gases 64 pass through the exhaust section 32 and provide thrust. In one aspect, the exhaust section 32 may be, for example, an ejector nozzle in which the high velocity, high temperature combustion gases 64 act as a primary jet, thereby creating a low pressure area at the nozzle exit. The ejector nozzle may also include a variable exit nozzle. Ambient air is drawn into the primary jet via the low pressure at the nozzle exit, thereby inducing a convergent-divergent flow of the primary jet and the ambient air drawn into the primary jet, and the combined flow accelerates the exhaust stream.

In further operation of the engine 10, another portion of the inlet air 52 propelled by the fan assembly 14 flows through the bypass airflow passage 48, thereby providing a bypass airflow 66. The bypass airflow 66 provides a majority of the thrust for the engine 10.

Continuing with the discussion of FIG. 1, the LP compressor 22 includes at least one low-pressure compressor bleed air passage 70 through which a portion of the compressed air 58 from the LP compressor 22 flows as a bleed air 58*a*. As will be described in more detail below, the bleed air 58*a* may be utilized by a power generating system 68. In addition, the HP compressor 24 includes at least one high-pressure compressor bleed air passage 72 through which a portion of the compressed air 60 may flow as a high-pressure compressor bleed air 60*a*.

Figure 2:
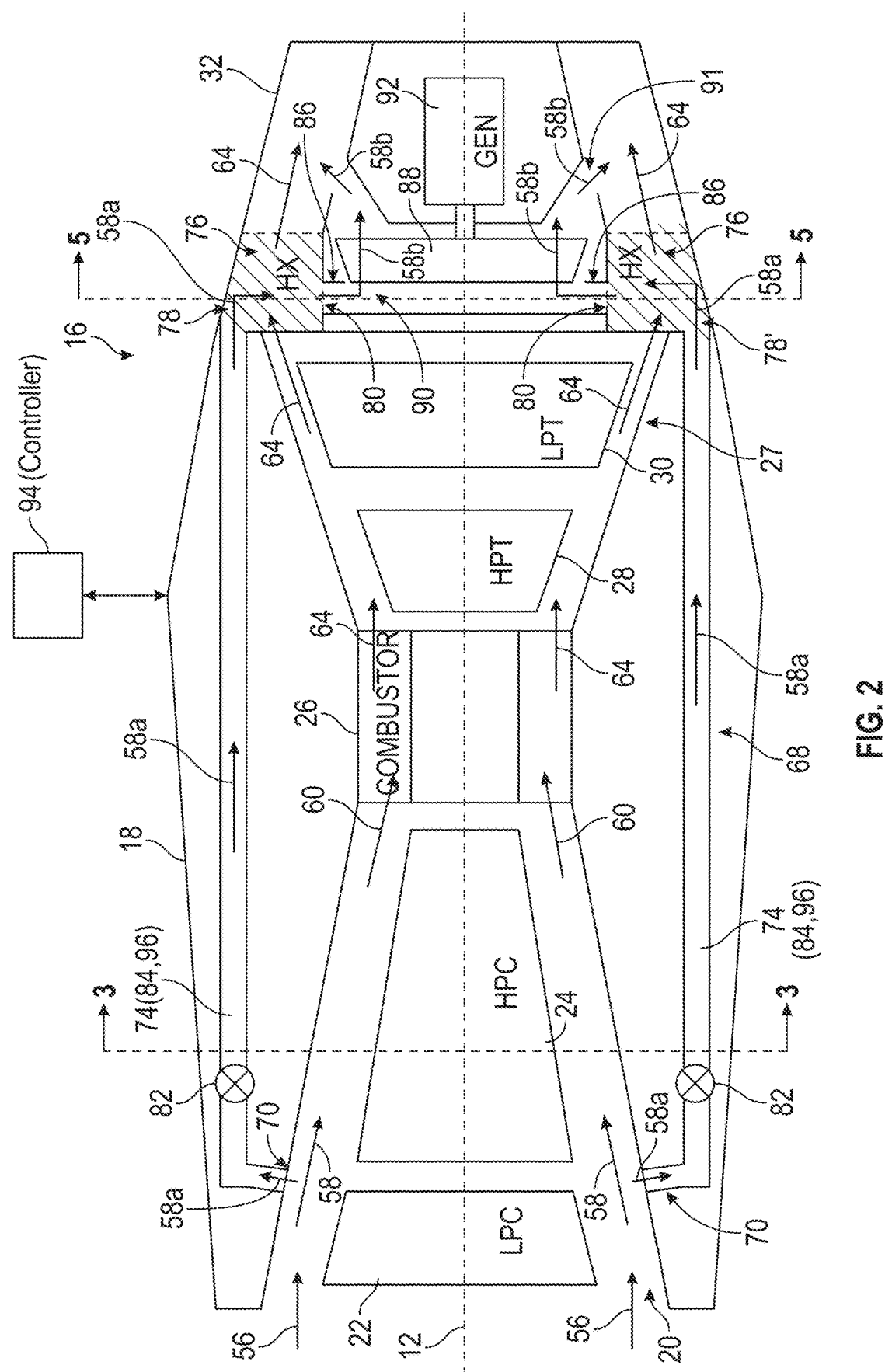
FIG. 2 is a schematic diagram of a layout of a turbo-engine having an exemplary power generating system, according to an aspect of the present disclosure.

FIG. 2 is a schematic diagram of a layout of the turbo-engine 16 having an exemplary power generating system 68, according to an aspect of the present disclosure. In FIG. 2, elements that are the same as those described above for FIG. 1 include the same reference numerals. Referring to FIG. 2 and to FIG. 1, the power generating system 68 includes at least one compressor bleed air duct 74 that is arranged in fluid communication with the at least one low-pressure compressor bleed air passage 70. By being in fluid communication with the at least one low-pressure compressor bleed air passage 70, the at least one compressor bleed air duct 74 may be considered as a low-pressure compressor bleed air duct 84. In FIG. 2, references to the compressor bleed air duct 74 are interchangeable with the low-pressure compressor bleed air duct 84. The at least one compressor bleed air duct 74 (or the low-pressure compressor bleed air duct 84) may be, for example, a single annular duct that extends circumferentially about the longitudinal centerline axis 12 of the engine 10. Alternatively, as will be described in more detail below, the at least one compressor bleed air duct 74 (or the low-pressure compressor bleed air duct 84) may be constituted of a plurality of compressor bleed air ducts. The power generating system 68 also includes at least one bleed air valve 82 (two shown in FIG. 1 and in FIG. 2) that controls the flow of the bleed air 58*a* through the at least one compressor bleed air duct 74 (or through the low-pressure compressor bleed air duct 84).

The power generating system 68 also includes a heat exchanger 76 that is arranged within the exhaust section 32. The heat exchanger 76 may be an annular heat exchanger that extends circumferentially about the longitudinal centerline axis 12, or, as will be described in more detail below, may be constituted of a plurality of heat exchanger portions that are circumferentially spaced apart from each other about the longitudinal centerline axis 12. The heat exchanger 76 includes a heat exchanger inlet 78 that is arranged in fluid communication with the at least one compressor bleed air duct 74, or, as shown in the FIG. 2 aspect, with the low-pressure compressor bleed air duct 84. The heat exchanger 76 also includes a heat exchanger outlet 80 that is arranged in fluid communication with a power turbine feed duct 86. As shown in FIG. 1 and in FIG. 2, the flow of the combustion gases 64, after flowing through the LP turbine 30, flows through the heat exchanger 76 and then exits the exhaust section 32 to provide thrust. Thus, the heat exchanger 76 may be referred to as a waste-heat-recovery heat exchanger in that the heat exchanger 76 merely utilizes waste heat from the combustion gases 64 as a heat exchange medium.

The power generating system 68 of FIG. 2 also includes a power turbine 88 having a power turbine inlet 90 arranged in fluid communication with the power turbine feed duct 86 and a power turbine outlet 91 that is in fluid communication with the exhaust section 32. The power turbine 88 is connected to a generator 92 and is arranged to drive the generator 92 to generate power.

As shown in FIG. 1 and in FIG. 2, the bleed air 58*a* flowing through the at least one low-pressure compressor bleed air passage 70 flows through the low-pressure compressor bleed air duct 84 to the heat exchanger inlet 78. The flow of the bleed air 58*a* may be controlled by the at least one bleed air valve 82. The at least one bleed air valve 82 may be controlled by, for example, the engine controller 94. The bleed air 58*a* flows through the heat exchanger 76 and a temperature of the bleed air 58*a* is increased in the heat exchanger 76 by the combustion gases 64 flowing through the heat exchanger 76. Thus, the bleed air 58*a* is heated to generate heated bleed air 58*b* that flow through the heat exchanger outlet 80 to the power turbine feed duct 86. The heated bleed air 58*b* then flows through the power turbine inlet 90 and work is extracted from the heated bleed air 58*b* by the power turbine 88, thereby causing the power turbine 88 to rotate. The rotation of the power turbine 88 drives rotation of the generator 92 to generate power. The generator 92 may generate power in the form of electrical power, or as mechanical power. The heated bleed air 58*b* then flows from the power turbine 88 back into the exhaust section 32 to mix with the combustion gases 64 and to provide thrust. Thus, the power generating system 68 of FIG. 2 may constitute an open loop Brayton cycle type machine that generates power. That is, the power generating system may operate simply by providing heated airflow to drive the power turbine, where the airflow is compressor bleed air that is heated using waste heat from the exhaust of the engine. In addition, when the ejector nozzle is implemented as the exhaust section 32, such a configuration can reduce a back-pressure on the power turbine 88.

Figure 3:
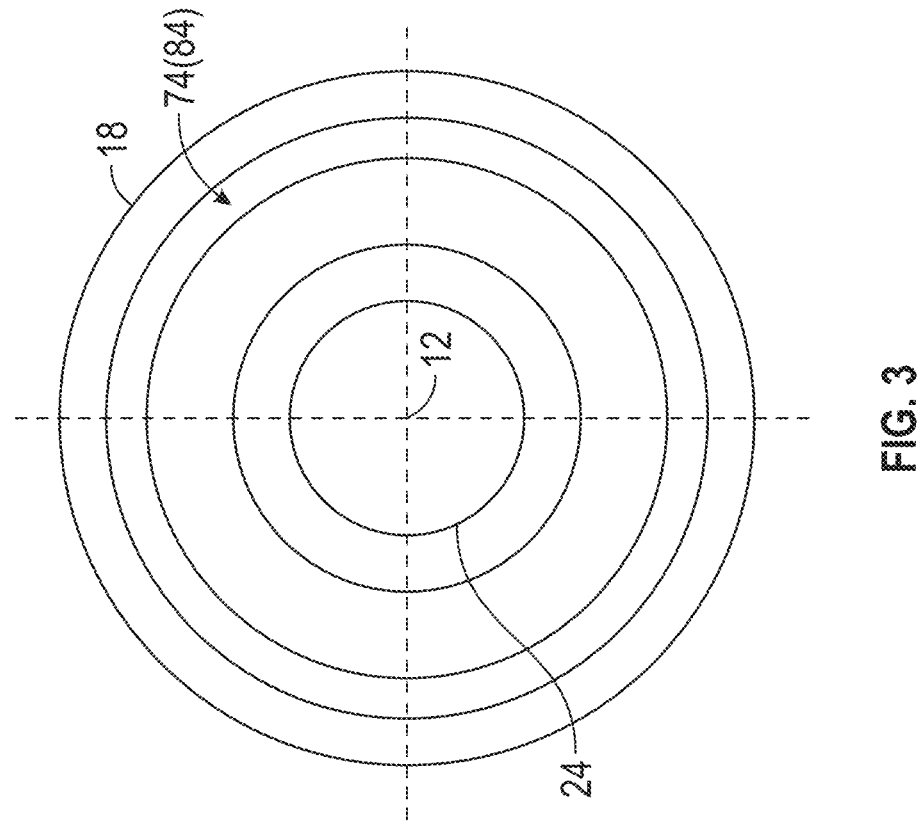
FIG. 3 is a schematic aft-looking view of a compressor bleed air duct of FIG. 2, taken at plane 3-3 of FIG. 2, according to an aspect of the present disclosure.

FIG. 3 is a schematic aft-looking view of the compressor bleed air duct 74 of FIG. 2, taken at plane 3-3 of FIG. 2, according to an aspect of the present disclosure. As shown in FIG. 3, the compressor bleed air duct 74 (or the low-pressure compressor bleed air duct 84) extends circumferentially about the longitudinal centerline axis 12 such that the compressor bleed air duct 74 is an annular bleed air duct. The annular bleed air duct is arranged in fluid communication with the at least one low-pressure compressor bleed air passage 70, and, when a plurality of the low-pressure compressor bleed air passages 70 are implemented in the LP compressor 22, each of the plurality of the low-pressure compressor bleed air passages 70 is arranged in fluid communication with the annular bleed air duct.

Figure 4:
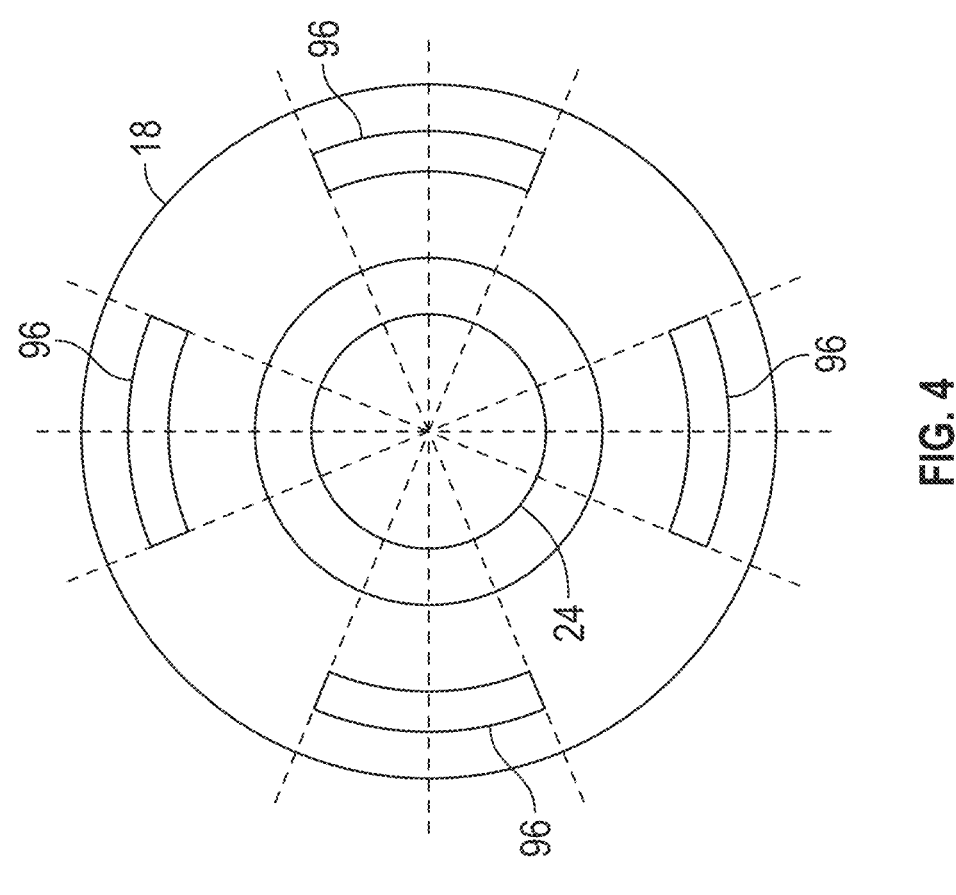
FIG. 4 is a schematic aft-looking view of an alternate arrangement of a compressor bleed air duct to that shown in FIG. 3, according to an aspect of the present disclosure.

FIG. 4 is a schematic aft-looking view of an alternate arrangement of the compressor bleed air duct 74 to that shown in FIG. 3, according to an aspect of the present disclosure. As shown in FIG. 4, rather than the compressor bleed air duct 74 extending circumferentially about the longitudinal centerline axis 12 as shown in FIG. 3, the compressor bleed air duct 74 may comprise a plurality of low-pressure compressor bleed air ducts 96 that are circumferentially spaced apart from one another about the longitudinal centerline axis 12. When the plurality of low-pressure compressor bleed air ducts 96 are implemented, the at least one low-pressure compressor bleed air passage 70 may include a plurality of the low-pressure compressor bleed air passages 70 that are circumferentially spaced apart from each other about the longitudinal centerline axis 12. Each one of the plurality of low-pressure compressor bleed air ducts 96 is arranged in fluid communication with a respective one of the plurality of the low-pressure compressor bleed air passages 70. In addition, each one of the plurality of low-pressure compressor bleed air ducts 96 is arranged in fluid communication with the heat exchanger 76 (FIG. 2).

Figure 5:
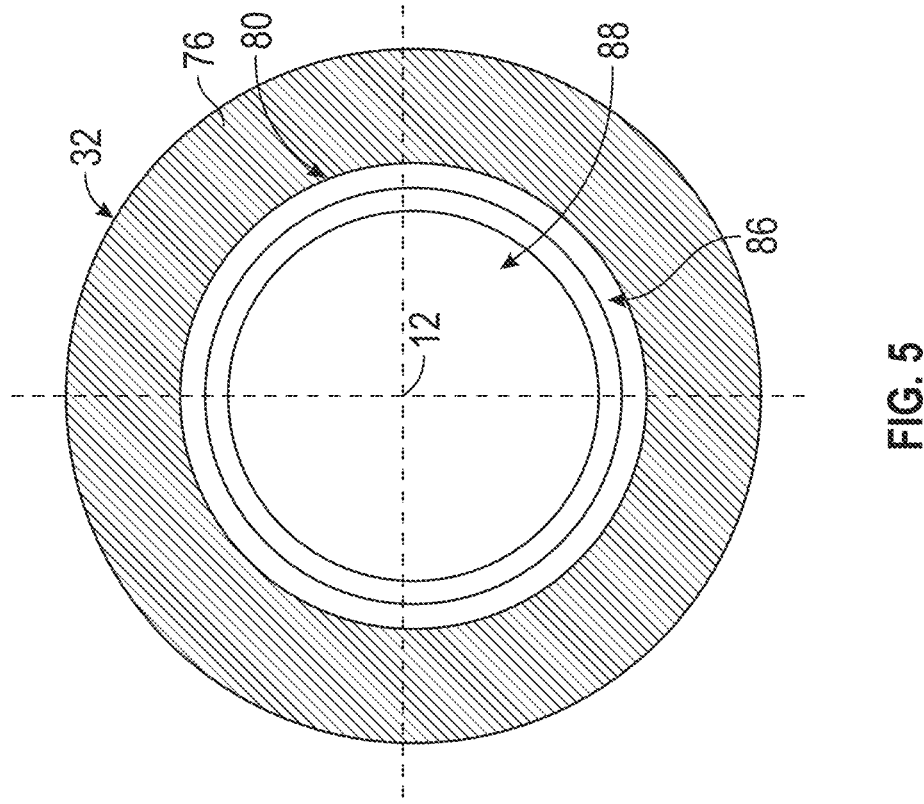
FIG. 5 is a schematic, cross-sectional, aft-looking view of a heat exchanger of FIG. 2, taken at plane 5-5 of FIG. 2, according to an aspect of the present disclosure.

FIG. 5 is a schematic, cross-sectional, aft-looking view of the heat exchanger 76 of FIG. 2, taken at plane 5-5 of FIG. 2, according to an aspect of the present disclosure. As shown in FIG. 5, the heat exchanger 76 extends circumferentially about the longitudinal centerline axis 12 such that the heat exchanger 76 is an annular heat exchanger. As was described above, the heat exchanger 76 is arranged in fluid communication with the at least one compressor bleed air duct 74, such as the annular compressor bleed air duct 74 of FIG. 3. When the heat exchanger 76 is the annular heat exchanger as shown in FIG. 5, the heat exchanger outlet 80 and the power turbine feed duct 86 may also be annular and extend circumferentially about the longitudinal centerline axis 12.

Figure 6:
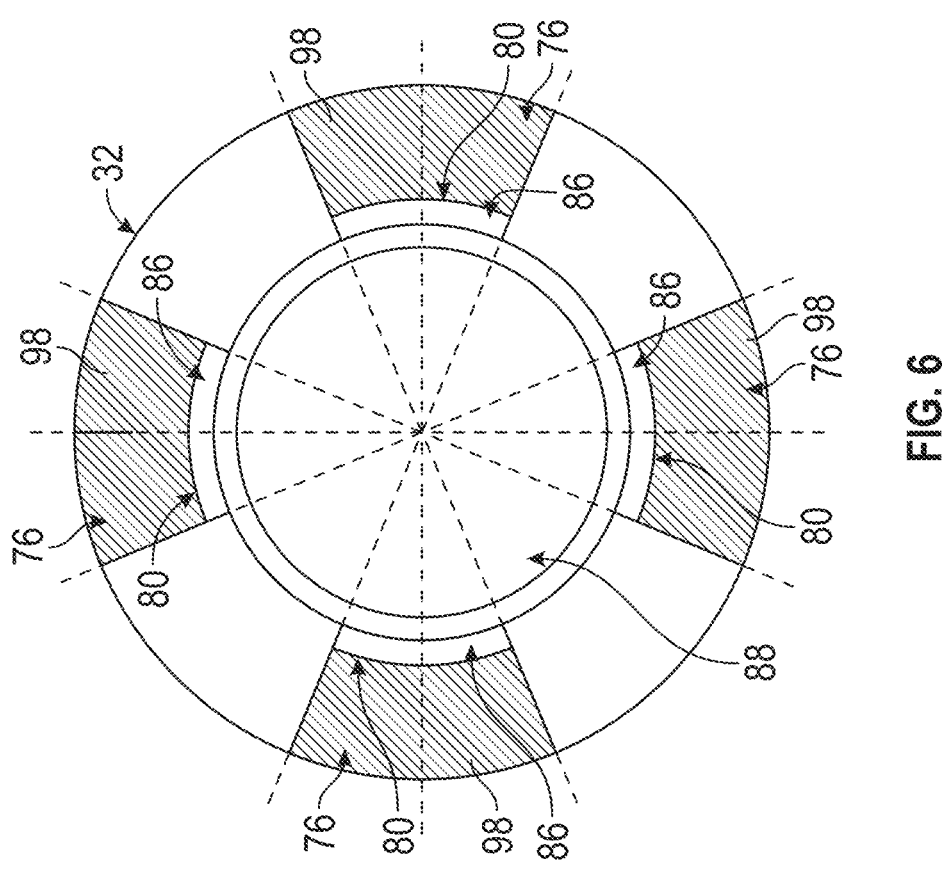
FIG. 6 is a schematic, cross-sectional, aft-looking view of an alternate arrangement of a heat exchanger to that shown in FIG. 5, according to an aspect of the present disclosure.

FIG. 6 is a schematic, cross-sectional, aft-looking view of an alternate arrangement of the heat exchanger 76 to that shown in FIG. 5, according to an aspect of the present disclosure. As shown in FIG. 6, rather than the heat exchanger 76 extending circumferentially about the longitudinal centerline axis 12 as shown in FIG. 5, the heat exchanger 76 may comprise a plurality of heat exchangers 98 that are circumferentially spaced apart from one another about the longitudinal centerline axis 12. Each heat exchanger 98 includes a respective heat exchanger outlet 80 that is in fluid communication with a respective power turbine feed duct 86. Thus, the power turbine feed duct 86 may be implemented as a plurality of power turbine feed ducts 86 for respective ones of the heat exchangers 98 to provide a respective flow of the heated bleed air 58b (FIG. 2) to the power turbine 88 (FIG. 2). When the plurality of heat exchangers 98 are implemented, the plurality of compressor bleed air ducts 96 of FIG. 4 may also be implemented such that, respective ones of the plurality of compressor bleed air ducts 96 are in fluid communication with a respective heat exchanger inlet 78 (FIG. 2) of a respective one of the heat exchangers 98. That is, the FIG. 6 aspect and the FIG. 4 aspect may be implemented together.

Figure 7:
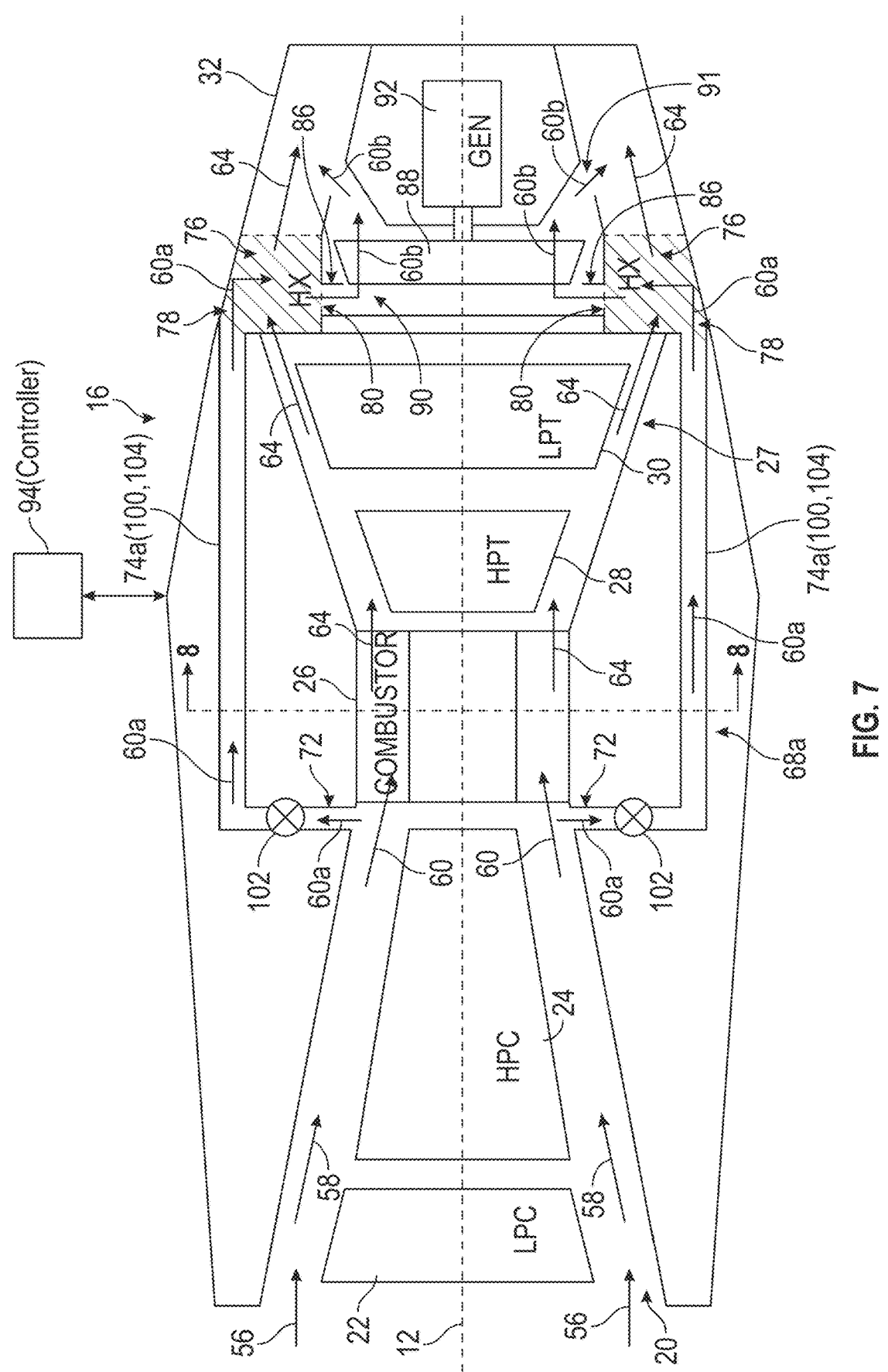
FIG. 7 is a schematic diagram of a layout of an alternate power generating system to the power generating system of FIG. 2, according to an aspect of the present disclosure.

FIG. 7 is a schematic diagram of a layout of an alternate power generating system 68a to the power generating system 68 of FIG. 2, according to an aspect of the present disclosure. In FIG. 7, elements that are the same as those described above for FIG. 2 include the same reference numerals. In FIG. 7, a compressor bleed air duct 74a is arranged to provide a flow of bleed air 60a from the high-pressure compressor bleed air passages 72 to the heat exchanger 76. Thus, the compressor bleed air duct 74a may be referred to as a high-pressure compressor bleed air duct 100. The flow of the bleed air 60a through the high-pressure compressor bleed air duct 74a is controlled by one or more bleed air valves 102, which may be controlled by the engine controller 94.

Figures 8, 9:
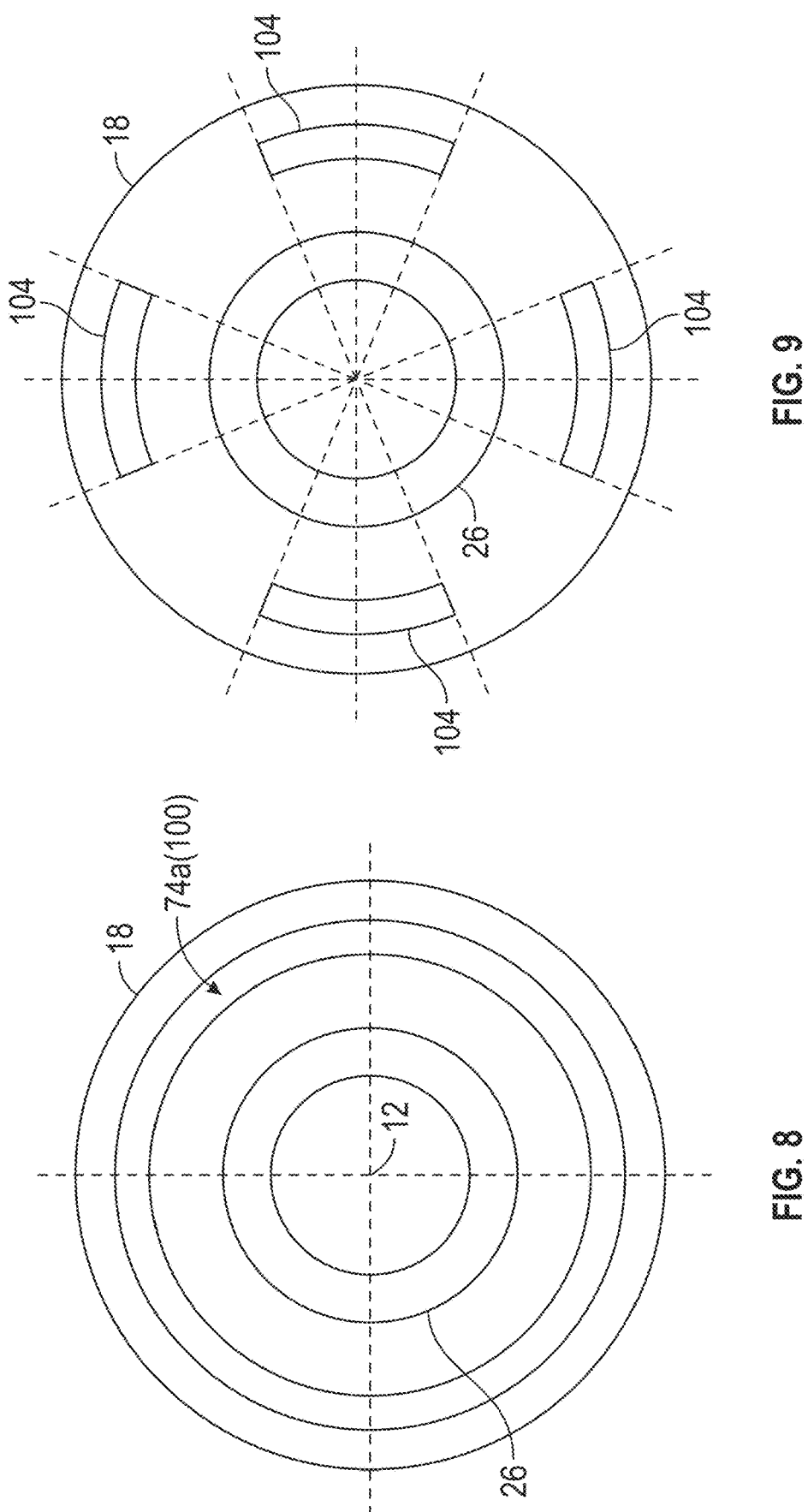
FIG. 8 is a schematic aft-looking view of a compressor bleed air duct of FIG. 7, taken at plane 8-8 of FIG. 7, according to an aspect of the present disclosure.
FIG. 9 is a schematic aft-looking view of an alternate arrangement of a compressor bleed air duct to that shown in FIG. 8, according to an aspect of the present disclosure.

FIG. 8 is a schematic aft-looking view of the compressor bleed air duct 74a of FIG. 7, taken at plane 8-8 of FIG. 7, according to an aspect of the present disclosure. As shown in FIG. 8, the compressor bleed air duct 74a (or the high-pressure compressor bleed air duct 100) extends circumferentially about the longitudinal centerline axis 12 such that the compressor bleed air duct 74a is an annular bleed air duct. The annular bleed air duct is in fluid communication with the at least one high-pressure compressor bleed air passage 72, and, when a plurality of the high-pressure compressor bleed air passages 72 are implemented in the HP compressor 24, each of the plurality of the high-pressure compressor bleed air passages 72 is in fluid communication with the annular bleed air duct.

FIG. 9 is a schematic aft-looking view of an alternate arrangement of the compressor bleed air duct 74a to that shown in FIG. 8, according to an aspect of the present disclosure. As shown in FIG. 9, rather than the compressor bleed air duct 74a extending circumferentially about the longitudinal centerline axis 12 as shown in FIG. 8, the compressor bleed air duct 74a may comprise a plurality of high-pressure compressor bleed air ducts 104 that are circumferentially spaced apart from one another about the longitudinal centerline axis 12. When the plurality of high-pressure compressor bleed air ducts 104 are implemented, the at least one high-pressure compressor bleed air passage 72 may include a plurality of the high-pressure compressor bleed air passages 72 that are circumferentially spaced apart from each other about the longitudinal centerline axis 12. Each one of the plurality of high-pressure compressor bleed air ducts 104 is in fluid communication with a respective one of the plurality of the high-pressure compressor bleed air passages 104. In addition, each one of the plurality of high-pressure compressor bleed air ducts 104 is in fluid communication with the heat exchanger 76 (FIG. 2).

Thus, the alternate power generating system 68a of FIG. 7 operates similar to the power generating system 68 of FIG. 2, but utilizes the bleed air 60a from the HP compressor 24 instead of the bleed air 58a from the LP compressor 22. The bleed air 60a from the high-pressure compressor 24 has a higher temperature than the bleed air 58a from the LP compressor 22, and, therefore, a higher temperature heated bleed air 60b may be obtained and provided to the power turbine 88.

Figure 10:
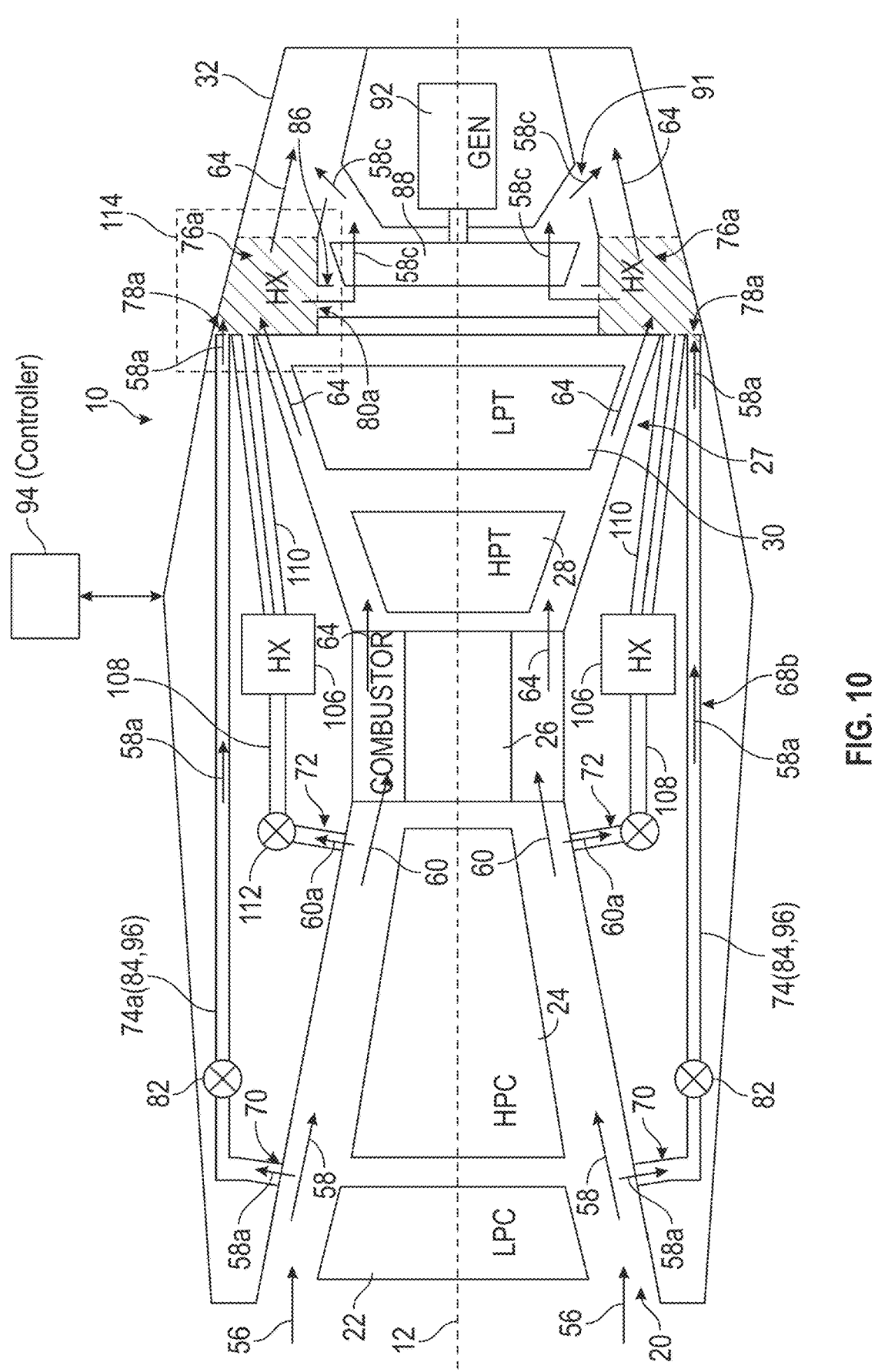
FIG. 10 is a schematic diagram of a layout of another alternate power generating system to the power generating system of FIG. 2, according to an aspect of the present disclosure.

FIG. 10 is a schematic diagram of a layout of another alternate power generating system 68b to the power generating system 68 of FIG. 2, according to an aspect of the present disclosure. In FIG. 10, elements that are the same as those described above for FIG. 2 include the same reference numerals. In FIG. 10, the alternate power generating system 68b includes a cooled cooling air heat exchanger 106, and a high-pressure compressor bleed air duct 108. The high-pressure compressor bleed air duct 108 receives a flow of the high-pressure compressor bleed air 60a via a bleed air valve 112 from the at least one high-pressure compressor bleed air passages 72, and provides the flow of the high-pressure compressor bleed air 60a to the cooled cooling air heat exchanger 106. As will be described below, the cooled cooling air heat exchanger 106 utilizes the high-pressure compressor bleed air 60a to further increase the temperature of the heated bleed air 58a to generate an additionally heated bleed air 58c. The alternate power generating system 68b also includes an alternate heat exchanger 76a (described in more detail below), and a cooled cooling air heat exchanger duct 110 that is in fluid communication with the alternate heat exchanger 76a and with the cooled cooling air heat exchanger 106.

Figure 11:
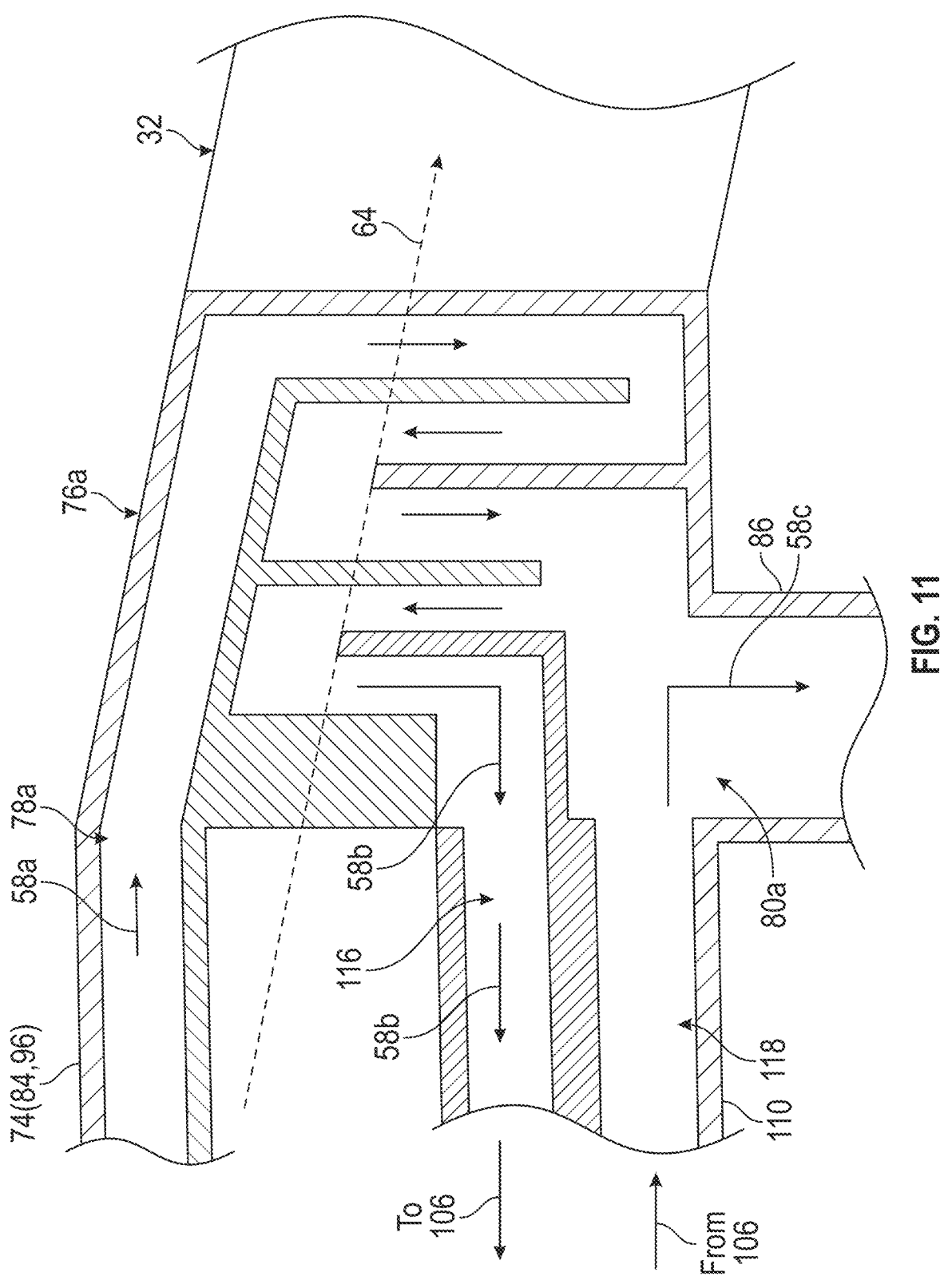
FIG. 11 is a cross-sectional, detail view of an alternate heat exchanger, taken at detail view 114 of FIG. 10, according to an aspect of the present disclosure.

FIG. 11 is a cross-sectional, detail view of the alternate heat exchanger 76a of FIG. 10, taken at detail view 114, according to an aspect of the present disclosure. As shown in FIG. 11, the alternate heat exchanger 76a includes a heat exchanger inlet 78a and a heat exchanger outlet 80a. In the same manner described above with regard to FIG. 2, the compressor bleed air duct 74 is in fluid communication with the heat exchanger inlet 78a and provides a flow of the bleed air 58a to the alternate heat exchanger 76a. The cooled cooling air heat exchanger duct 110 is in fluid communication with the alternate heat exchanger 76a, and the cooled cooling air heat exchanger duct 110 includes an inlet portion 116 and an outlet portion 118.

In operation, the bleed air 58a provided to the alternate heat exchanger 76a is heated within the alternate heat exchanger 76a by the combustion gases 64 in a similar manner to that described above for FIG. 2. However, rather than the heated bleed air 58b flowing through the heat exchanger outlet 80 into the power turbine feed duct 86, the heated bleed air 58a flows into the inlet portion 116 of the cooled cooling air heat exchanger duct 110 and to the cooled cooling air heat exchanger 106. In the cooled cooling air heat exchanger 106, the high-pressure compressor bleed air 60a is utilized as a heat exchange medium to further increase the temperature of the heated bleed air 58a, and an additionally heated bleed air 58c is output from the cooled cooling air heat exchanger 106 to the outlet portion 118 of the cooled cooling air heat exchanger duct 110. The additionally heated bleed air 58c is then output from the heat exchanger outlet 80a to the power turbine feed duct 86 to drive the power turbine 88 (FIG. 10).

FIG. 12 is a flowchart of process steps for a method of generating auxiliary power in a gas turbine engine (e.g., engine 10 depicted in FIG. 1), according to an aspect of the present disclosure. The method may be implemented in the engine 10 described above with regard to any of FIG. 1 to FIG. 11. In particular, the method is implemented in the engine 10 that includes the LP compressor 22 having the at least one low-pressure compressor bleed air passage 70, the HP compressor 24 having the at least one high-pressure compressor bleed air passage 72, the combustor 26, the turbine section 27, the exhaust section 32, and any of the power generating system 68, the power generating system 68a, or the power generating system 68b. In step S1201 of the method, the engine 10 is operated to generate the combustion gases 64 and to provide the combustion gases 64 to flow through the heat exchanger 76 of the power generating system 68. As was described above with regard to FIG. 1 and FIG. 2, the engine 10 is operated to cause the inlet air 52 to the engine 10 to flow through the LP compressor 22 and the HP compressor 24, to provide the compressed airflow 60 from the HP compressor 24 to the combustor 26, to generate the combustion gases 64 within the combustor 26, to provide the combustion gases 64 from the combustor 26 to the turbine section 27, and to provide the combustion gases 64 from the turbine section 27 to the exhaust section 32 and to flow through the heat exchanger 76.

In step S1202, the flow of the bleed air 58a is provided to the heat exchanger 76. As was described above with regard to FIG. 2, the bleed air valve 82 is controlled by the engine controller 94 to control the flow of the bleed air 58a to flow to the heat exchanger inlet 78 of the heat exchanger 76. In the case when the power generating system 68a of FIG. 7 is implemented, for step S1202, the bleed air valve 102 is controlled by the engine controller 94 to provide the flow of the high-pressure compressor bleed air 60a to the heat exchanger inlet 78 of the heat exchanger 76.

In step S1203, the bleed air 58a (or the high-pressure compressor bleed air 60a) is heated in the heat exchanger 76 by the heat exchanger 76 utilizing the combustion gases 64 as a heat exchange medium. In the heat exchanger 76, the flow of the bleed air 58a (or the flow of the bleed air 60a) is heated to increase a temperature of the flow of the bleed air 58a (or the flow of the bleed air 60a) to generate the flow of the heated bleed air 58b (or to generate the flow of the heated bleed air 60b).

Step S1204 is optional, and is applied only for the FIG. 10 aspect that includes the cooled cooling air heat exchanger 106. The FIG. 2 aspect and the FIG. 7 aspect do not include step S1204, and, for the FIG. 2 aspect and the FIG. 7 aspect, step S1204 is skipped and the process proceeds to step S1205. In step S1204 for the FIG. 10 aspect, the heated bleed air 58b is provided to the cooled cooling air heat exchanger 106 via the inlet portion 116 (FIG. 11) of the cooled cooling air heat exchanger duct 110. The heated bleed air 58b is then further heated by the cooled cooling air heat exchanger 106 utilizing the high-pressure compressor bleed air 60a as a heat exchange medium. The cooled cooling air heat exchanger 106 generates the additionally heated bleed air 58c, and, the additionally heated bleed air 58c is provided back to the heat exchanger outlet 80 via the outlet portion 118 (FIG. 11) of the cooled cooling air heat exchanger duct 110.

In step S1205, the flow of the heated bleed air 58b (or the flow of the heated bleed air 60b for the FIG. 7 aspect) flows out of the heat exchanger outlet 80 to the power turbine feed duct 86 and to the power turbine 88. When the FIG. 10 aspect is implemented, in step S1205, the flow of the additionally heated bleed air 58c is provided to flow out the heat exchanger outlet 80a (FIG. 11) to the power turbine feed duct 86 and to the power turbine 88.

In step S1206, the flow of the heated bleed air 58b (or the flow of the heated bleed air 60a, or the flow of the additionally heated bleed air 58c) flowing through the power turbine feed duct 86 into the power turbine 88 causes the power turbine 88 to rotate. In step S1207, the rotation of the power turbine 88 rotates the generator 92 connected with the power turbine 88 and causes the generator to generate power.

Each of the foregoing aspects of the power generating system provides a Brayton cycle type machine for generating auxiliary power by using waste heat from the exhaust section 32 of the engine 10 and bleed air from either the LP compressor 22, the HP compressor 24, or both. The foregoing aspects provide an alternate technique for generating auxiliary power without having to incorporate a steam system with a steam turbine to drive a generator, and without having to incorporate a generator driven by an accessory gearbox.

Further aspects are provided by the subject matter of the following clauses.

A power generating system for a gas turbine engine, the gas turbine engine including a low-pressure compressor having a low-pressure compressor bleed air passage, a high-pressure compressor having a high-pressure compressor bleed air passage, a combustor, a turbine section, and an exhaust section, the power generating system comprising a compressor bleed air duct receiving a flow of bleed air from one of the low-pressure compressor bleed air passage or from the high-pressure compressor bleed air passage, a heat exchanger arranged within the exhaust section and having a heat exchanger inlet arranged in fluid communication with the compressor bleed air duct, and a heat exchanger outlet, the heat exchanger inlet receiving the flow of the bleed air from the compressor bleed air duct and providing the flow of the bleed air to flow through the heat exchanger, the heat exchanger receiving a flow of combustion gases from the turbine section, the combustion gases flowing through the heat exchanger and heating the flow of bleed air flowing therethrough to increase a temperature of the flow of the bleed air to generate a flow of heated bleed air that flows out of the heat exchanger outlet, a power turbine feed duct arranged in fluid communication with to the heat exchanger outlet and to receive the flow of the heated bleed air from heat exchanger outlet, a power turbine having a power turbine inlet arranged in fluid communication with the power turbine feed duct and to receive the flow of the heated bleed air from the power turbine feed duct, the flow of the heated bleed air flowing through the power turbine to drive rotation of the power turbine, and a generator connected to the power turbine and driven by the power turbine to generate power.

The power generating system according to the preceding clause, wherein the heat exchanger is a waste-heat-recovery to air heat exchanger.

The power generating system according to any preceding clause, wherein the power turbine includes a power turbine outlet that is arranged in fluid communication with the exhaust section of the gas turbine engine.

The power generating system according to any preceding clause, wherein the compressor bleed air duct comprises a high-pressure compressor bleed air duct arranged in fluid communication with the high-pressure compressor bleed air passage.

The power generating system according to any preceding clause, wherein the generator, in generating the power, outputs one of electrical power or mechanical power.

The power generating system according to any preceding clause, wherein the compressor bleed air duct comprises a plurality of high-pressure compressor bleed air ducts, each high-pressure compressor bleed air duct of the plurality of high-pressure compressor bleed air ducts being arranged in fluid communication with the heat exchanger inlet.

The power generating system according to any preceding clause, wherein the high-pressure compressor bleed air passage comprises a plurality of high-pressure compressor bleed air passages, each high-pressure compressor bleed air passage of the plurality of high-pressure compressor bleed air passages being arranged in fluid communication with a respective one of the plurality of high-pressure compressor bleed air ducts.

The power generating system according to any preceding clause, wherein the compressor bleed air duct comprises a low-pressure compressor bleed air duct arranged in fluid communication with the low-pressure compressor bleed air passage.

The power generating system according to any preceding clause, further including a bleed air valve controlling the flow of the bleed air from the low-pressure compressor bleed air passage to the low-pressure compressor bleed air duct.

The power generating system according to any preceding clause, further including a cooled cooling air heat exchanger arranged in fluid communication with the heat exchanger to receive the flow of the heated bleed air and to provide a flow of additionally heated bleed air to the power turbine feed duct, and a high-pressure compressor bleed air duct in fluid communication with the cooled cooling air heat exchanger and arranged in fluid communication with the high-pressure compressor bleed air passage, the high-pressure compressor bleed air duct providing a flow of high-pressure compressor bleed air from the at least one high-pressure compressor bleed air passage to the cooled cooling air heat exchanger to further increase a temperature of the heated bleed air to generate the additionally heated bleed air, the flow of the additionally heated bleed air being provided to the power turbine feed duct and to the power turbine.

The power generating system according to any preceding clause, wherein the compressor bleed air duct comprises a plurality of low-pressure compressor bleed air ducts, each low-pressure compressor bleed air duct of the plurality of low-pressure compressor bleed air ducts being arranged in fluid communication with the heat exchanger inlet.

The power generating system according to any preceding clause, wherein the low-pressure compressor bleed air passage comprises a plurality of low-pressure compressor bleed air passages, each low-pressure compressor bleed air passage of the plurality of low-pressure compressor bleed air passages being arranged in fluid communication with a respective one of the plurality of low-pressure compressor bleed air ducts.

A gas turbine engine including a low-pressure compressor having a low-pressure compressor bleed air passage, a high-pressure compressor having a high-pressure compressor bleed air passage, a combustor, a turbine section, an exhaust section, and a power generating system, the power generating system including (a) a compressor bleed air duct receiving a flow of bleed air from one of the low-pressure compressor bleed air passage or from the high-pressure compressor bleed air passage, (b) a heat exchanger arranged within the exhaust section and having a heat exchanger inlet arranged in fluid communication with the at least one compressor bleed air duct, and a heat exchanger outlet, the heat exchanger inlet receiving the flow of the bleed air from the a compressor bleed air duct and providing the flow of the bleed air to flow through the heat exchanger, the heat exchanger receiving a flow of combustion gases from the turbine section, the combustion gases flowing through the heat exchanger and heating the flow of bleed air flowing therethrough to increase a temperature of the flow of the bleed air to generate a flow of heated bleed air that flows out of the heat exchanger outlet, (c) a power turbine feed duct arranged in fluid communication to the heat exchanger outlet and to receive the flow of the heated bleed air from heat exchanger outlet, (d) a power turbine having a power turbine inlet arranged in fluid communication with the power turbine feed duct and to receive the flow of the heated bleed air from the power turbine feed duct, the flow of the heated bleed air flowing through the power turbine to drive rotation of the power turbine, and (e) a generator connected to the power turbine and driven by the power turbine to generate power.

The gas turbine engine according to the preceding clause, wherein the heat exchanger is a waste-heat-recovery to air heat exchanger.

The gas turbine engine according to any preceding clause, wherein the power turbine includes a power turbine outlet that is arranged in fluid communication with the exhaust section of the gas turbine engine.

The gas turbine engine according to any preceding clause, wherein the compressor bleed air duct comprises a high-pressure compressor bleed air duct arranged in fluid communication with the high-pressure compressor bleed air passage.

The gas turbine engine according to any preceding clause, wherein the generator, in generating the power, outputs one of electrical power or mechanical power.

The gas turbine engine according to any preceding clause, wherein the compressor bleed air duct comprises a plurality of high-pressure compressor bleed air ducts, each high-pressure compressor bleed air duct of the plurality of high-pressure compressor bleed air ducts being arranged in fluid communication with the heat exchanger inlet.

The gas turbine engine according to any preceding clause, wherein the high-pressure compressor bleed air passage comprises a plurality of high-pressure compressor bleed air passages, each high-pressure compressor bleed air passage of the plurality of high-pressure compressor bleed air passages being arranged in fluid communication with a respective one of the plurality of high-pressure compressor bleed air ducts.

The gas turbine engine according to any preceding clause, wherein the compressor bleed air duct comprises a low-pressure compressor bleed air duct arranged in fluid communication with the low-pressure compressor bleed air passage.

The gas turbine engine according to any preceding clause, further including a bleed air valve controlling the flow of the bleed air from the low-pressure compressor bleed air passage to the low-pressure compressor bleed air duct.

The gas turbine engine according to any preceding clause, further including a cooled cooling air heat exchanger arranged within the power turbine feed duct, the flow of the heated bleed air flowing through the cooled cooling air heat exchanger, and a high-pressure compressor bleed air duct in fluid communication with the cooled cooling air heat exchanger and in fluid communication with the high-pressure compressor bleed air passage, the high-pressure compressor bleed air duct providing a flow of high-pressure compressor bleed air from the high-pressure compressor bleed air passage to the cooled cooling air heat exchanger to further increase a temperature of the heated bleed air to generate a flow of an additionally heated bleed air, the flow of the additionally heated bleed air flowing through the power turbine feed duct to the power turbine.

The gas turbine engine according to any preceding clause, wherein the compressor bleed air duct comprises a plurality of low-pressure compressor bleed air ducts, each low-pressure compressor bleed air duct of the plurality of low-pressure compressor bleed air ducts being arranged in fluid communication with the heat exchanger inlet.

The gas turbine engine according to any preceding clause, wherein the low-pressure compressor bleed air passage comprises a plurality of low-pressure compressor bleed air passages, each low-pressure compressor bleed air passage of the plurality of low-pressure compressor bleed air passages being arranged in fluid communication with a respective one of the plurality of low-pressure compressor bleed air ducts.

A method of generating auxiliary power in a gas turbine engine, the gas turbine engine including (a) a low-pressure compressor having a low-pressure compressor bleed air passage, (b) a high-pressure compressor having a high-pressure compressor bleed air passage, (c) a combustor, (d) a turbine section, (e) an exhaust section, and (f) a power generating system, the power generating system including (i) a compressor bleed air duct arranged in fluid communication with one of the low-pressure compressor bleed air passage or the high-pressure compressor bleed air passage, (ii) a heat exchanger arranged within the exhaust section and having a heat exchanger inlet arranged in fluid communication with the compressor bleed air duct, and a heat exchanger outlet, (iii) a power turbine feed duct arranged in fluid communication with the heat exchanger outlet, (iv) a power turbine having a power turbine inlet arranged in fluid communication with the power turbine feed duct, and (v) a generator connected to the power turbine to be driven by the power turbine to generate power, the method comprising operating the gas turbine engine (1) to cause in an inlet airflow to the gas turbine engine to flow through the low-pressure compressor and the high-pressure compressor, (2) to provide a compressed airflow from the high-pressure compressor to the combustor, (3) to generate combustion gases within the combustor, (4) to provide the combustion gases from the combustor to the turbine section, and (5) to provide the combustion gases from the turbine section to the exhaust section and to flow through the heat exchanger, providing a flow of bleed air from one of the low-pressure compressor bleed air passage or from the high-pressure compressor bleed air passage to the compressor bleed air duct and to the heat exchanger inlet to flow through the heat exchanger, heating, by the combustion gases flowing through the heat exchanger, the flow of bleed air flowing through the heat exchanger to increase a temperature of the flow of the bleed air to generate a flow of a heated bleed air, providing the flow of the heated bleed air to flow out of the heat exchanger outlet to the power turbine feed duct and to the power turbine, and causing the power turbine to rotate by the heated bleed air flowing through the power turbine, and the generator generating power by the rotation of the power turbine.

The method according to the preceding clause, wherein the heat exchanger being a waste-heat-recovery to air heat exchanger.

The method according to any preceding clause, wherein the power turbine includes a power turbine outlet that is arranged in fluid communication with the exhaust section of the gas turbine engine.

The method according to any preceding clause, wherein the compressor bleed air duct comprises a high-pressure compressor bleed air duct arranged in fluid communication with the high-pressure compressor bleed air passage.

The method according to any preceding clause, wherein the generator, in generating the power, outputs one of electrical power or mechanical power.

The method according to any preceding clause, wherein the compressor bleed air duct comprises a plurality of high-pressure compressor bleed air ducts, each high-pressure compressor bleed air duct of the plurality of high-pressure compressor bleed air ducts being arranged in fluid communication with the heat exchanger inlet.

The method according to any preceding clause, wherein the high-pressure compressor bleed air passage comprises a plurality of high-pressure compressor bleed air passages, each high-pressure compressor bleed air passage of the plurality of high-pressure compressor bleed air passages being arranged in fluid communication with a respective one of the plurality of high-pressure compressor bleed air ducts.

The method according to any preceding clause, wherein the compressor bleed air duct comprises a low-pressure compressor bleed air duct arranged in fluid communication with the low-pressure compressor bleed air passage.

The method according to any preceding clause, further including a bleed air valve controlling the flow of the bleed air from the low-pressure compressor bleed air passage to the low-pressure compressor bleed air duct.

The method according to any preceding clause, further including a cooled cooling air heat exchanger arranged within the power turbine feed duct, the flow of the heated bleed air flowing through the cooled cooling air heat exchanger, and a high-pressure compressor bleed air duct arranged in fluid communication with the cooled cooling air heat exchanger and in fluid communication with the high-pressure compressor bleed air passage, the high-pressure compressor bleed air duct providing a flow of high-pressure compressor bleed air from the high-pressure compressor bleed air passage to the cooled cooling air heat exchanger to further increase a temperature of the heated bleed air to generate a flow of an additionally heated bleed air, the flow of the additionally heated bleed air flowing through the power turbine feed duct to the power turbine.

The method according to any preceding clause, wherein the compressor bleed air duct comprises a plurality of low-pressure compressor bleed air ducts, each low-pressure compressor bleed air duct of the plurality of low-pressure compressor bleed air ducts being arranged in fluid communication with the heat exchanger inlet.

The method according to any preceding clause, wherein the low-pressure compressor bleed air passage comprises a plurality of low-pressure compressor bleed air passages, each low-pressure compressor bleed air passage of the plurality of low-pressure compressor bleed air passages being arranged in fluid communication with a respective one of the plurality of low-pressure compressor bleed air ducts.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A power generating system for a gas turbine engine, the gas turbine engine including a low-pressure (LP) compressor having an LP compressor bleed air passage, a high-pressure (HP) compressor having an HP compressor bleed air passage, a combustor, a turbine section, and an exhaust section, the power generating system comprising:

an LP compressor bleed air duct receiving a flow of bleed air from the LP compressor bleed air passage;

a heat exchanger arranged within the exhaust section and having a heat exchanger inlet arranged in fluid communication with the LP compressor bleed air duct, and a heat exchanger outlet, the heat exchanger inlet receiving the flow of the bleed air from the LP compressor bleed air duct and providing the flow of the bleed air to flow through the heat exchanger, the heat exchanger receiving a flow of combustion gases from the turbine section, the combustion gases flowing through the heat exchanger and heating the flow of bleed air flowing therethrough to increase a temperature of the flow of the bleed air to generate a flow of heated bleed air;

a cooled cooling air heat exchanger arranged in fluid communication with the heat exchanger to receive the flow of the heated bleed air from the heat exchanger;

an HP compressor bleed air duct arranged in fluid communication with the cooled cooling air heat exchanger and arranged in fluid communication with the HP compressor bleed air passage, the HP compressor bleed air duct providing a flow of HP compressor bleed air from the HP compressor bleed air passage to the cooled cooling air heat exchanger to further increase a temperature of the heated bleed air to generate an additionally heated bleed air, the additionally heated bleed air being provided from the cooled cooling air heat exchanger to the heat exchanger;

a power turbine feed duct arranged in fluid communication with the heat exchanger outlet to receive the flow of the additionally heated bleed air from heat exchanger outlet;

a power turbine having a power turbine inlet arranged in fluid communication with the power turbine feed duct to receive the flow of the additionally heated bleed air from the power turbine feed duct, the flow of the additionally heated bleed air flowing through the power turbine to drive rotation of the power turbine; and a generator connected to the power turbine and driven by the power turbine to generate power.

2. The power generating system according to claim 1, wherein the heat exchanger is a waste-heat-recovery to air heat exchanger.

3. The power generating system according to claim 1, wherein the power turbine includes a power turbine outlet that is arranged in fluid communication with the exhaust section of the gas turbine engine.

4. The power generating system according to claim 1, wherein the generator, in generating the power, outputs one of electrical power or mechanical power.

5. The power generating system according to claim 1, further comprising a bleed air valve controlling the flow of the bleed air from the LP compressor bleed air passage to the LP compressor bleed air duct.

6. The power generating system according to claim 1, wherein the LP compressor bleed air duct comprises a plurality of LP compressor bleed air ducts, each LP compressor bleed air duct of the plurality of LP compressor bleed air ducts being arranged in fluid communication with the heat exchanger inlet.

7. The power generating system according to claim 6, wherein the LP compressor bleed air passage comprises a plurality of LP compressor bleed air passages, each LP compressor bleed air passage of the plurality of LP compressor bleed air passages being arranged in fluid communication with a respective one of the plurality of LP compressor bleed air ducts.

8. A gas turbine engine comprising:

a low-pressure (LP) compressor having an LP compressor bleed air passage;

a high-pressure (HP) compressor having an HP compressor bleed air passage;

a combustor;

a turbine section;

an exhaust section; and a power generating system including (a) an LP compressor bleed air duct receiving a flow of bleed air from the LP compressor bleed air passage, (b) a heat exchanger arranged within the exhaust section and having a heat exchanger inlet arranged in fluid communication with the LP compressor bleed air duct, and a heat exchanger outlet, the heat exchanger inlet receiving the flow of the bleed air from the LP compressor bleed air duct and providing the flow of the bleed air to flow through the heat exchanger, the heat exchanger receiving a flow of combustion gases from the turbine section, the combustion gases flowing through the heat exchanger and heating the flow of bleed air flowing therethrough to increase a temperature of the flow of the bleed air to generate a flow of heated bleed air, (c) a cooled cooling air heat exchanger arranged in fluid communication with the heat exchanger to receive the flow of the heated bleed air from the heat exchanger, (d) an HP compressor bleed air duct arranged in fluid communication with the cooled cooling air heat exchanger and arranged in fluid communication with the HP compressor bleed air passage, the HP compressor bleed air duct providing a flow of HP compressor bleed air from the HP compressor bleed air passage to the cooled cooling air heat exchanger to further increase a temperature of the heated bleed air to generate an additionally heated bleed air, the additionally heated bleed air being provided from the cooled cooling air heat exchanger to the heat exchanger; (e) a power turbine feed duct arranged in fluid communication with the heat exchanger outlet and to receive the flow of the additionally heated bleed air from heat exchanger outlet, (f) a power turbine having a power turbine inlet arranged in fluid communication with the power turbine feed duct and to receive the flow of the additionally heated bleed air from the power turbine feed duct, the flow of the additionally heated bleed air flowing through the power turbine to drive rotation of the power turbine, and (g) a generator connected to the power turbine and driven by the power turbine to generate power.

9. The gas turbine engine according to claim 8, wherein the LP compressor bleed air duct comprises a plurality of LP compressor bleed air ducts, each LP compressor bleed air duct of the plurality of LP compressor bleed air ducts being arranged in fluid communication with the heat exchanger inlet.

10. The gas turbine engine according to claim 9, wherein the LP compressor bleed air passage comprises a plurality of LP compressor bleed air passages, each LP compressor bleed air passage of the plurality of LP compressor bleed air passages being arranged in fluid communication with a respective one of the plurality of LP compressor bleed air ducts.

11. A method of generating auxiliary power in a gas turbine engine, the gas turbine engine including (a) a low-pressure (LP) compressor having an LP compressor bleed air passage, (b) a high-pressure (HP) compressor having an HP compressor bleed air passage, (c) a combustor, (d) a turbine section, (e) an exhaust section, and (f) a power generating system, the power generating system including (i) an LP compressor bleed air duct arranged in fluid communication with the LP compressor bleed air passage, (ii) a heat exchanger arranged within the exhaust section and having a heat exchanger inlet arranged in fluid communication with the LP compressor bleed air duct, and a heat exchanger outlet, (iii) a cooled cooling air heat exchanger arranged in fluid communication with the heat exchanger, (iv) an HP compressor bleed air duct arranged in fluid communication with the cooled cooling air heat exchanger and arranged in fluid communication with the HP compressor bleed air passage, (v) a power turbine feed duct arranged in fluid communication with the heat exchanger outlet, (vi) a power turbine having a power turbine inlet arranged in fluid communication with the power turbine feed duct, and (vii) a generator connected to the power turbine to be driven by the power turbine to generate power, the method comprising:

operating the gas turbine engine (1) to cause in an inlet airflow to the gas turbine engine to flow through the LP compressor and the HP compressor, (2) to provide a compressed airflow from the HP compressor to the combustor, (3) to generate combustion gases within the combustor, (4) to provide the combustion gases from the combustor to the turbine section, and (5) to provide the combustion gases from the turbine section to the exhaust section and to flow through the heat exchanger;

providing a flow of bleed air from the LP compressor bleed air passage to the LP compressor bleed air duct and to the heat exchanger inlet;

heating, by the combustion gases flowing through the heat exchanger, the flow of bleed air flowing through the heat exchanger to increase a temperature of the flow of the bleed air to generate a flow of a heated bleed air;

providing the flow of the heated bleed air from the heat exchanger to the cooled cooling air heat exchanger, and providing a flow of the HP compressor bleed air via the HP compressor bleed air duct to the cooled cooling air heat exchanger;

heating, by the flow of the HP compressor bleed air in the cooled cooling air heat exchanger, the flow of the heated bleed air to generate an additionally heated bleed air, and providing a flow of the additionally heated bleed air from the cooled cooling air heat exchanger to the heat exchanger;

providing the flow of the additionally heated bleed air to flow out of the heat exchanger outlet to the power turbine feed duct and to the power turbine; and causing the power turbine to rotate by the additionally heated bleed air flowing through the power turbine, and the generator generating power by the rotation of the power turbine.

* * * * *